United States Patent [19]
Heyden

[11] Patent Number: 5,737,890
[45] Date of Patent: Apr. 14, 1998

[54] FRAME ASSEMBLY

[76] Inventor: Marsha Vander Heyden, 151 W. 25th St., New York, N.Y. 10001

[21] Appl. No.: 544,701

[22] Filed: Oct. 18, 1995

[51] Int. Cl.⁶ .................................................. E06B 3/70
[52] U.S. Cl. .......................... 52/455; 52/456; 52/656.9
[58] Field of Search ........................ 52/455, 456, 656.8, 52/314, 656.1, 656.5, 656.9; 403/231

[56] References Cited

U.S. PATENT DOCUMENTS

| | | | |
|---|---|---|---|
| 3,566,561 | 3/1971 | Tozer | 52/729 X |
| 3,788,378 | 1/1974 | Sobel | 160/135 |
| 4,013,371 | 3/1977 | Nagase | 52/455 X |
| 4,387,545 | 6/1983 | Kern | 52/455 |
| 4,870,797 | 10/1989 | Hagemeyer | 52/455 |
| 5,218,807 | 6/1993 | Fulford | 52/455 |
| 5,261,203 | 11/1993 | Yoon | 52/455 |
| 5,361,552 | 11/1994 | Fulford | 52/455 |
| 5,584,154 | 12/1996 | Koepke et al. | 52/455 X |

*Primary Examiner*—Carl D. Friedman
*Assistant Examiner*—Beth Aubrey
*Attorney, Agent, or Firm*—McAulay Fisher Nissen Goldberg & Kiel, LLP

[57] ABSTRACT

A frame assembly of the knock-down type in which the component parts can be shipped or transported in a knock-down condition and readily constructed with a minimum of tools or no tools, and disassembled when desired. The frame assembly includes at least one pair of spaced vertical stiles and at least one pair of horizontal rails substantially orthogonal thereto, and associated connecting elements for connecting the stiles and rails, one of the connecting elements being joined with a stile at a corner connection thereof and another of the connecting elements being joined with a rail at a corner connection thereof so that a pair of the associated connecting elements joins one of the stiles to one of the rails, and all of the stiles and rails as appropriate are joined to each other.

19 Claims, 6 Drawing Sheets

FRAME ASSEMBLY

BACKGROUND OF THE INVENTION

1. Field of the Invention

This invention relates to furniture and millwork; and more particularly to a frame and panel or panels assembly which can be easily assembled or disassembled.

2. Description of the Prior Art

It is well known that one segment of the furniture and woodworking industry is concerned with what is generically known as "knock-down"—hereinafter "KD"—products, which is furniture and other woodwork items which can be easily assembled and disassembled so that the work can be shipped in a knock-down or disassembled condition and can be easily assembled by a lay person with limited mechanical ability. KD products for retail sale are usually referred to as "Ready to Assemble"—hereinafter RTA.

RTA furniture uses a wide variety of mechanically based fasteners. These vary in their machining, strength, construction and suitability for a given project. Some are fully exposed to view, some partially.

There are several basic categories of mechanical fasteners for joints needed to make a frame or other type of wood product requiring the joining of two pieces. Five types of fasteners are: a screw, a bolt, a cam, a wedge, and a nail or staple.

Bracket based corner joints have also been used, but these are ordinarily exposed to view and have limited application.

Most KD/RTA hardware after installation and project assembly would be exposed in a greater or lesser degree to view, unsightly and therefore unacceptable for this invention.

Some KD/RTA hardware cannot be disassembled.

In addition to the hardware previously discussed, there is a vast array of KD hardware available to the woodworking industry. Additional types of hardware which might be considered for assembly for this invention are as follows:

1. Hafele/bed fitting cat #271.53.000 single "keyhole" or #273.56.010 double "keyhole"—This product requires that a pocket be machined behind it to accommodate the head of a screw. This screw is the locking member for the horizontal part of the frame which butts to the vertical part of the frame holding the bed fitting. The screw used with the bed fitting does not have a positive stop for depth as does the collard screw used with the "Modular Connecting Fitting". Selby (#1093 & #1094) and Lamp/Sugatsune (S & W) make similar fittings.

2. Selby/bed rail fastener cat #74. Conceptually this product can work; however, as an off the shelf item, it is too long and would therefore not work for narrow rails (horizontal frame member) as the hardware would protrude beyond the width of the rail itself. For larger scale products it would be suitable. Also for high production runs this product could economically be scaled down. The hardware consists of a rectangular plate with two knockouts which receive the hooks mounted at right angles to a second plate. Pockets would have to be cut behind the plate with the knockouts to receive the hooks. A positive stop is integral to the design of the hardware. Lamp/Sugatsune makes a piece of hardware that is conceptually the same (BF-842-S & BF-842-W)

3. Hafele/nylon KD fitting ("dowel fastening") cat#039.40.707—Product consists of a male and female element; both made of nylon. Each section is inserted into a hole drilled into the section of the frame receiving it. It is possible with this hardware to use as many pairs as are needed to join a particular section. Because of the diameter of the hole to be drilled it would be necessary to use this on larger scaled frames making it impractical for a more standard thickness frame of 1¼" or less (for 1¼" thick frame the groove would be ½" as would be the tongue; thereby leaving no material for the hardware to be threaded into on the tongue). Selby (#630, 631, 632) and Lamp/Sugatsune (#CF-235) make similar products. This is one of the least desirable options.

4. Hafele/Haas fastener cat #262.48.000 —Comprised of two identical aluminum press-fit components with harpoon-type barbs. Each piece must be glued into position in addition to being press fitted. The hardware has a positive stop.

Joint strength with KD hardware fasteners appears to be somewhat higher than glued joints over time and the members are easily assembled and disassembled.

Prior art frames and panels have also been glued together with the disadvantage that as time passes the glue joint fails and becomes loose.

Prior art, such as that disclosed in U.S. Pat. No. 3,788,378 discloses a modular divider system which utilizes metal frame members which are joined together by top and bottom horizontal frames with interconnecting members mounted on an end surface of each vertical member so that a series of frames forming flush panels can be joined together to form a modular room divider for a modular office system. While this patent does disclose the addition of a fabric by removable means of a complimentary pin and slot device on the faces of the vertical members the fabric is applied as a sleeve to the exterior of the vertical support members. This type of assembly would be completely unsuitable for use in a decorative screen or for any frame assembly requiring the encapsulation of a panel by a surrounding frame. This prior art does not accomplish the goal of having an aesthetically pleasing product consisting of a panel surrounded by a decorative frame. Not only is the frame of this prior art industrial, unfinished metal; most importantly it was meant to be hidden from view and therefore not intended to embody any generally accepted or traditional aesthetic qualities.

When using frame and panel construction there have been two methods of proceeding. One is to glue, clean up and apply a finish to the frame separately and then secure the panel at the back with applied molding which is usually nailed in place. The second method is to completely assemble i.e. glue up, sand and apply a finish to the frame and panel as assembled. In this method the molding is integral on both sides and therefore retains the panel after the frame is glued up.

The use of molding or trim both for decorative purposes and for the utilitarian purpose of retaining panels is commonly used in frame and panel work. The machining and installation of these moldings can become quite problematic, most especially when there are deviations from the straight line. It is well known that frames may have design variations from a rectangular format. For these frames, for example the top rail may have a concave arc formation on the interior of the frame (or other e.g. curved pattern variation, which may be an interior and exterior arc). Ordinarily rabbets would be machined on the back of the frame and would receive the panels after frame assembly and finishing. This method is especially needed when one is using a panel insert which is other than wood (e.g. glass or fabric) and therefore needs to be installed after the frame is finished to keep it from being damaged.

The second method is usually used in higher production work. The frames, having integral molding, and the panels are assembled and joined prior to finishing. The frame with its integral panel is then finished as one piece. This makes things very difficult when using non-wood materials for panels.

There are other considerations. Some problems in manufacturing procedures can arise. One being that the groove or rabbet plowed to receive the panel would usually be machined parallel to i.e. in conformance with, the edge of the curvilinear shape. It would require that the panel insert also be machined to mirror that shape; creating additional machining as opposed to simply cutting a square or rectangular panel shape. To avoid this problem and decrease labor costs the groove plowed for such design configurations could be plowed straight across and therefore would run perpendicular to the other panel receiving element e.g. groove, situated in the stiles. This would only be possible on designs which had top rails wide enough to allow this deep cut. Top rails which were curvilinear on both the outside and inside edges would have to have a panel receiving element e.g. groove, plowed parallel to the inside curve and the panel receiving element e.g. groove would maintain the same depth end for end; therefore the panel receiving element e.g. groove, would be curvilinear instead of straight across. The choice in machining of this top rail groove is a cost and machining set-up consideration.

SUMMARY OF THE INVENTION

It is an object of this invention to produce a completely finished, high quality product of frame and panel construction allowing for separate finishing of the frame and panel; further to have integral molding on both faces of frame regardless of frame design and for both faces of frame to be of equal design and quality and to allow for finishing of frame with no damage to especially non-wood panels such as fabric.

It is further the object of this invention to allow for the possibility for especially small custom shops to economically yaw the size of the frame based on the dimensions of the panel insert to be inserted and to quickly assemble and ship varying size orders without the currently extremely labor intensive and therefore prohibitive methods available to such shops.

A still further object of this invention to provide for an assembly for use in joining two adjacent members which can be easily assembled and disassembled.

Another object of the invention is to provide for an assembly for use in connection with KD/RTA furniture and general woodwork.

Another object of this invention is the provision of an assembly for use in joining two adjacent members so that the two adjacent members will be free of any exposure of hardware whereby no distinction is drawn between an obverse and a reverse side.

Yet another object of the invention is to provide for a method and system for KD/RTA furniture, readily usable in connection with few tools, if any and to provide for furniture which can be readily assembled and disassembled.

In its broadened aspect, the invention is concerned with a fully machined frame—decorative or functional—which can be assembled without the necessity of tools. More specifically, the frame according to the invention can be readily assembled and does not require the addition of separately applied molding strips to retain a panel insert as might be required for a traditionally conceived and machined piece. This alone eliminates assembly and machining procedures which are costly and time consuming.

The most important aspects of the invention are the use of KD hardware along with the use of fully machined, and in most uses, pre-finished frame parts. This permits convenient shipping of frames which heretofore would have required full assembly and therefore the shipment of a much larger article to the end user. This is an issue that greatly impacts shipping costs. It also permits the convenient use of a frame or folding screen in commercial displays so that the screen can be readily assembled without the use of tools at a display site. It permits the convenient changing of panel inserts as display materials change or need to be upgraded. Beyond the convenience offered in shipping and assembly; and alteration potential offered by this invention, it has the added benefit of permitting a frame member to be assembled with all of its decorative molding as integral to the rails and stiles; and not applied after joining of frame parts as is traditionally done. This is most especially useful for curved members. It eliminates the necessity of making separate curved small molded parts which are labor intensive and costly and difficult to produce. It further eliminates the necessity of the use of brads, air nails or screws to secure separate molding and the need to putty same for a fine finish. This feature of integral molding, as opposed to applied, most especially makes this invention useful to the RTA market.

Another feature of the invention is to overcome the problems inherent in some design configurations of frames, which have the concave arc formation i.e. the problems of design, cost and machining associated with this formation.

Another feature of the invention is to overcome the problems inherent in having, especially, a non-wood panel insert e.g. fabric which can be inserted after all wood parts have had their finish applied.

The KD (knock down) hardware used heretofore, to join the frame is a product as shown in the "Hafele" cabinet catalogue (cat #262.47.049 Standard Modular, or 262.47.058 Semi-Permanent Modular, or 262.47.012 Permanent Modular i.e. cannot be disassembled). It is called "modular connecting fitting" and is used in conjunction with a Hospa collared screw. The KD hardware is secured with screws (factory mounted) to the bottom of the panel receiving element e.g. groove machined on the inside edges of the frame. This hardware is placed at the point of the joint i.e. where the horizontal member butts the vertical member of the frame. On the stiles (verticals) are mounted a female portion of the hardware; consisting of a formed strip of metal with a keyhole slot to receive the head of the collared screw. On the ends of the rails (horizontals) are mounted a male KD hardware piece consisting of a screw with a protruding head and integral flange (collared screw).

With the installation of the KD hardware, according to the invention, on the stiles and rails the frame can be assembled by the end user without the use of glue, nails, screws, clamps, screwdrivers, wrenches or pliers. The assembled product appears to the viewer as a traditionally joined decorative frame, and what is important is that the frame presents a finished appearance regardless of whether it is viewed from the obverse or the reverse.

It is therefore another object of the invention to provide a furniture assembly consisting of a frame and panel which can be easily assembled and disassembled without the use of glue.

The invention in its broadest aspects, comprises at least two (side) vertical (stile) frame members and at least two (top and bottom) horizontal (rail) members. Along all interior edges, a panel receiving element e.g. groove is plowed to receive both the connecting hardware and the panel insert; therefore, the exterior rails and stiles forming the perimeter of the frame would have a groove plowed on one side only (the one facing the interior of the frame). The center vertical and horizontal members would have a groove plowed on both edges (since both edges face the interior of the frame).

The frame and panel assembly in accordance with this invention is easily assembled and/or disassembled and can be readily used with fabric, art work, or numerous types of other materials for assemblies of frames and panels. To form a set of two or more frames; with pictures, designs or carvings, for example as panel inserts, the frames are often hinged—but not necessarily so. This configuration is most often used as folding room screens for decorative use. In some instances disassembly may be more difficult depending on the configuration of the assembly.

BRIEF DESCRIPTION OF THE DRAWINGS

In order that the invention may be more clearly understood and readily carried into effect, the same will now be described and explained in connection with the accompanying drawings, in which:

FIG. 5 is another frame embodiment according to the invention which is a modification to the frame of FIG. 1 and includes a pair of rails—top and bottom, and center mullions (interior members of a frame separating the panels from each other) both vertical and horizontal. A variation of FIG. 5 would be to have both top and bottom rails run through or to have the center mullion run through;

DESCRIPTION OF THE PREFERRED EMBODIMENTS

Referring now more particularly to the drawings, and in particular to FIGS. 1 to 4 of the accompanying drawings; frame assembly 10 generally includes a pair of oppositely disposed vertical side stiles 12, 14 and two horizontal rails 16, 18 and a center divider or mullion 20.

Each of the rails and stiles is provided with a panel receiving portion e.g. groove 22 to receive a panel 24 shown in dashed outline. The outer portions of each panel receiving portion e.g. groove is provided with arcuate surface (this design varies) portions 26, 28 and form corners 30 which are coped and therefore provide a uniformly merging overlap and an outer flush surface 32, excepting the chamfer recess at the joinder of the rails and stiles along the faces 34, 36.

In the FIGS. 1–4 embodiments, one starts with two stiles 12 and 14 and the three horizontal rails although only two horizontal rails are required, but for purposes of discussion, horizontal rails 16, 18 and 20 will be discussed. Each of the stiles and rails include a panel receiving element, e.g. a groove 22, and the central rail (mullion) includes two panel receiving elements, e.g. grooves 22 in order to receive an insert or panel 24 on each side thereof. Reference is now made to FIGS. 7–11 in order to explain the connector. As shown in FIGS. 7–10, each connector assembly 40 as shown in FIG. 11 includes a first element 42 and a second element 44. Element 42 is receivable within panel receiving portion, e.g. groove 22 and includes a pair of tabs 46, 48 having screw openings 50 for connection to the bottom or flat surface 22B of panel receiving portion e.g. groove, 22 and each of the tabs 46, and 48 includes a flat surface 46F and 48F which is placed against flat surface 22B and screwed into the stile by means of screws 52 which pass through the openings 50 and provide a tight connection with the surface material beneath the base of 22B. Connection element 44 includes a threaded screw member 54 having a screw head 56 and a collar 58 which rests against the base member 22TB of the rail.

Connector element 40 in addition to the tabs 46 and 48 includes a substantially U-shaped member 60 having a base portion 62 and arms 64 and 66 joined and formed continuously with tabs 46, and 48. Tab 46 of base member 62, includes an opening 460 which has an opening wide enough to receive screw head 56 but insufficiently wide to receive collar 58.

Tab 64 has the opening 640 which is connected with opening 460 and extends along U-shaped arm 64 and connects with opening 620 in the base 62 of U-shaped member 60. Opening 620 has a diameter which is wide enough to receive screw head 56 with shaft 70 between screw head 56 and collar 58 slidable within opening 620. Collar 58 acts as a stop so that when screw 44 is secured into its position in the rail it allows the dimension between the underside of collar 58 and the underside of screw head 56 to remain constant. This allows the manufacturer to calibrate and set other dimensions so as to establish and set up an appropriate tension to hold the rail and stile in a given position against one another. In addition, the thickness surrounding the opening of 620 increases from the portion near entry point 62A to the bottom i.e. far end 62B so that by the time shaft 70 moves down to the base at 62C, there is a tight fit between base 62 and screw head 56 caused by a wedging action. It is the tension between the back of screw head 56 and the underside of 64, in conjunction with correct machining of frame members that holds the pieces of the frame in position one against the other. The connection can be made either by the use of hand force or a rubber mallet to tap one member into the other member.

Figure 7:
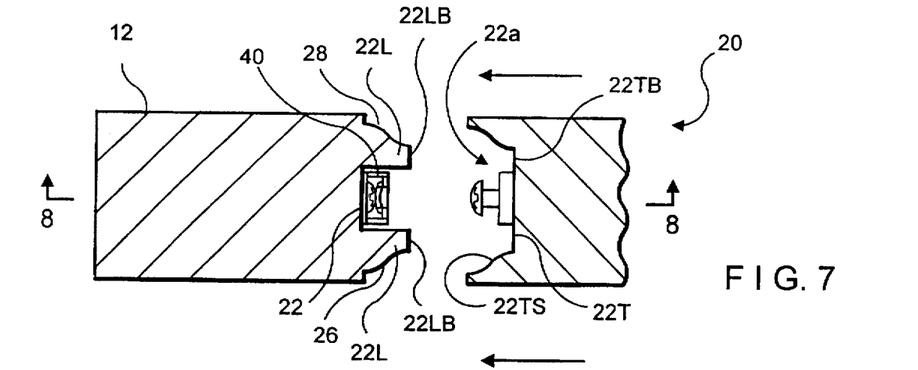
FIG. 7 is a sectional view taken along line 7—7 of FIG. 4 and showing a stile and rail spaced from each other which are to be connected together.
Figure 10:
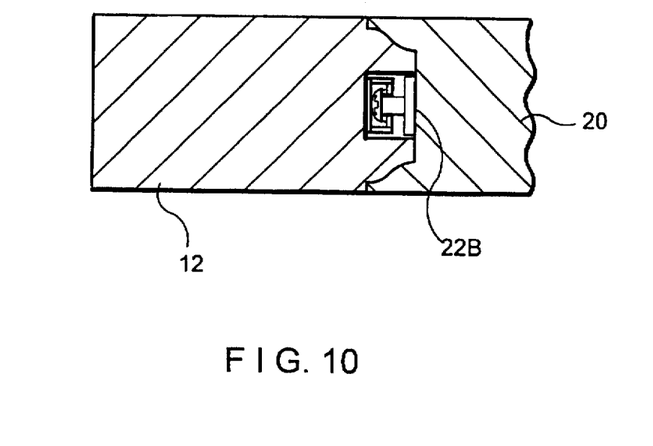
FIG. 10 is a sectional view taken along line 10—10 of FIG. 9 or a sectional view taken along line 10—10 of FIG. 1,5,12 or 13 illustrating another view of the stile and rail as connected to each other.
Figure 11:
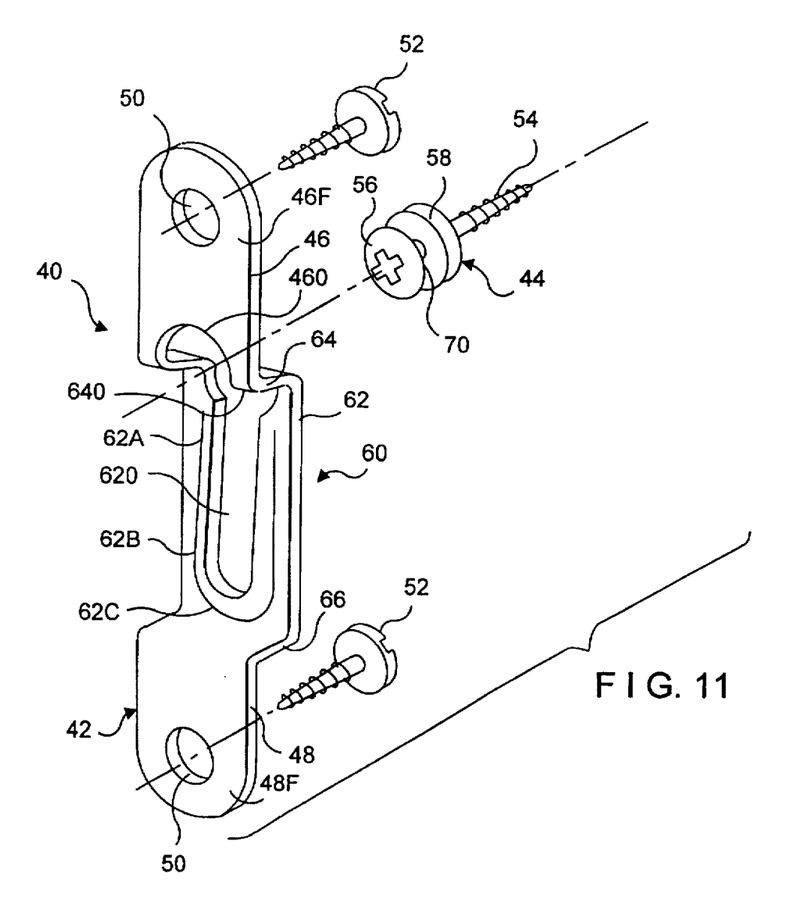
FIG. 11 is a perspective view of the prior art connecting elements in their spaced disassembled condition.

As best seen in FIG. 10, an example of connector assembly 40 is shown with second connector element 44 joined with rail 20 and first connector element 42 joined with stile 12. As best seen in FIG. 7, stile 12 and rail 20 are disconnected from each other.

Figure 8:
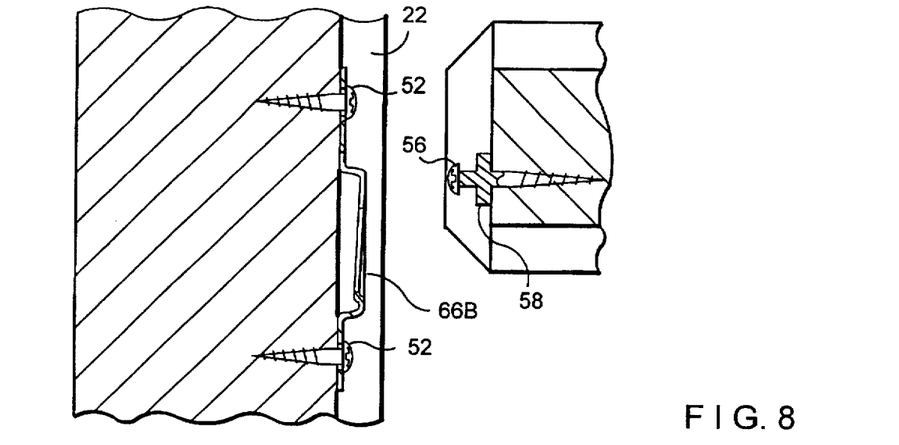
FIG. 8 is a vertical sectional view taken along line 8—8 of FIG. 7 of a center rail (mullion) and a stile separated from each other and illustrating the connecting elements in their disconnected condition.
Figure 9:
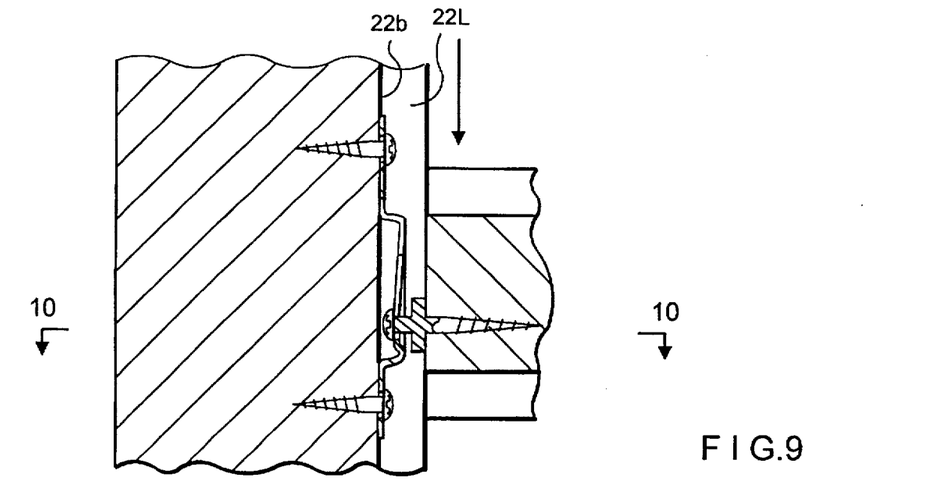
FIG. 9 is a vertical sectional view similar to that of FIG. 8 showing a stile and a center rail (mullion) connected to each other and taken along line 9—9 of FIG. 10.

Referring now to FIGS. 7-9, connector assembly 40 is secured within the panel receiving element e.g. groove 22, and panel receiving element e.g. groove 22 includes upstanding sides or legs 22L each having a leading end 22LB. Rail 20 which is machined (i.e. coped) to compliment the machining (i.e. molding pattern) of stile 12 will fit with and onto the outer section of legs 22L. The end of rail 20 includes a trapezoidal configuration formed by the slope of the inner sides of legs 22TS. The substantial U-shaped inner trapezoidal configuration receives the legs 22L of 22 with the leading end 22LB of the legs 22L being held against the base 22TB when connectors 42 and 44 are connected together. The spacing between screw head 56 and collar 58 is longer than the thickness 62B. The locking engagement is maintained by the molding pattern of 22L being firmly held against the opposite, but complimentary molding pattern of 22TS, when the connectors 42 and 44 are engaged and by the tension created by the wedging action created by the back of screw head 58 pulling behind surface 62 of connector element 40. The surface portion of trapezoidal sides 22TS and the outer surface portion of 22L are always complementary to each other and could be any pattern chosen.

While in the present discussion of an explanation of various embodiments, the stiles have been shown with first connector element or locking element 42 and the rails with second connector or locking element 44, it will be evident from the further explanation of other embodiments that these connectors can be interchanged between placement on rail and stile.

Figure 1:
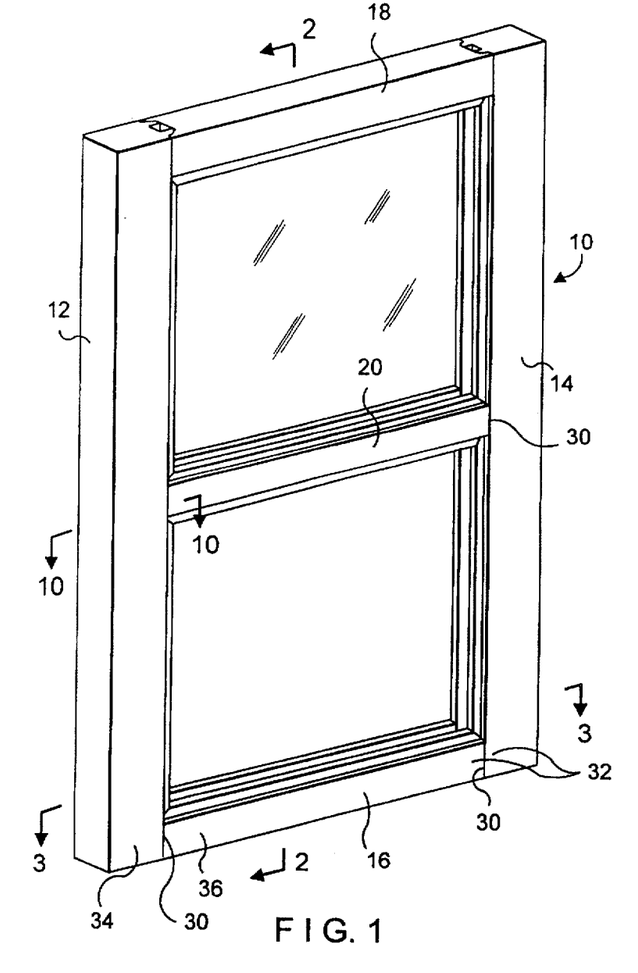
FIG. 1 is a front perspective view of an assembled individual frame having rails and stiles adapted to receive an insert prior to assembly and easily disassembled to change or remove inserts held by the rails and stiles and illustrating one center rail connected between the two vertical stiles.
Figure 2:
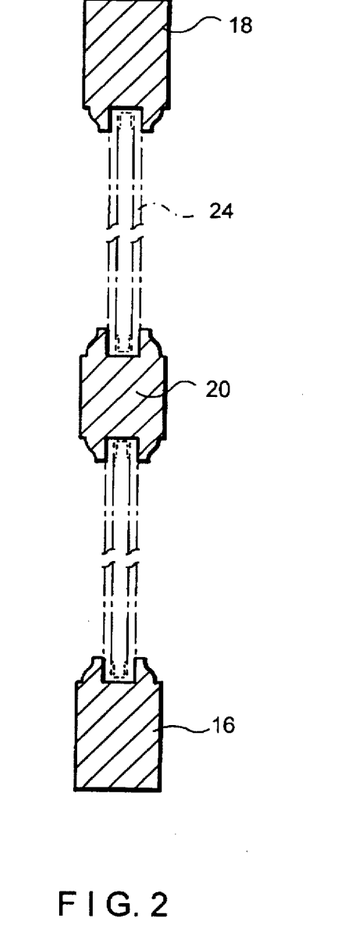
FIG. 2 is a longitudinal sectional view taken along line 2—2 of FIG. 1 or line 2—2 of FIG. 5 illustrating the rails in section spaced from each and appropriately spaced to hold inserts shown in dot-dashed outline.
Figure 3:
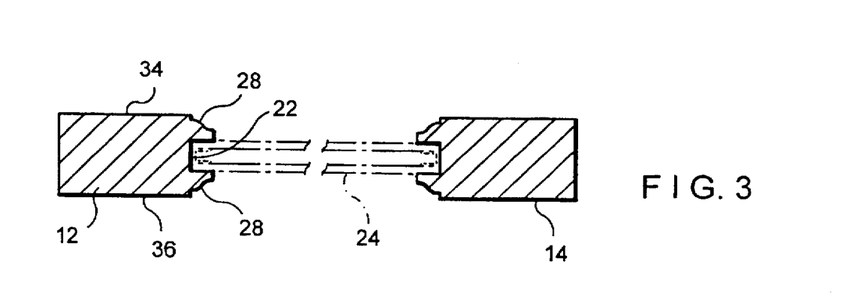
FIG. 3 is a transverse sectional view taken along line 3—3 of FIG. 1 showing a pair of spaced stiles with the inserts shown in dot-dashed outline.
Figure 4:
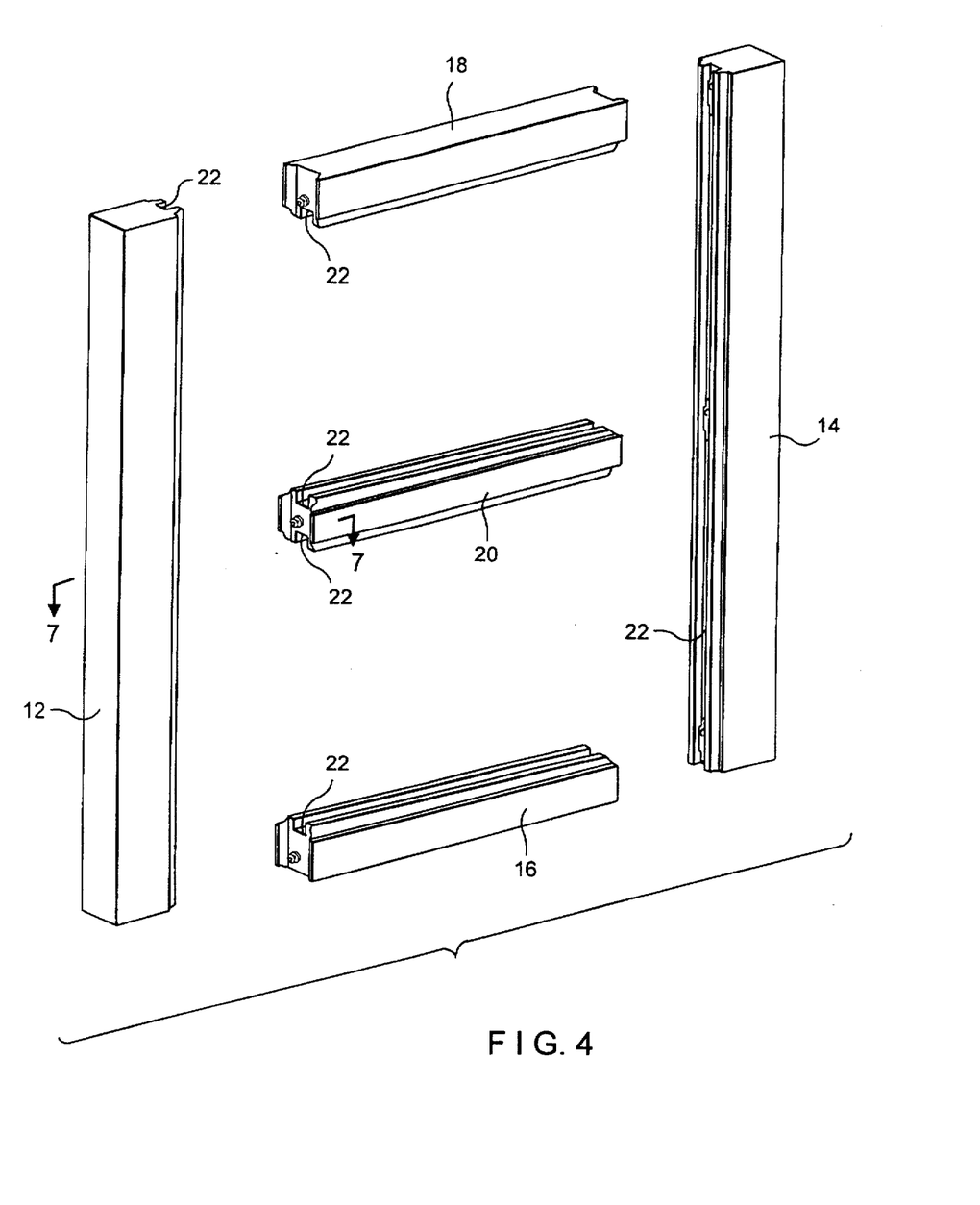
FIG. 4 is a view showing the frame of FIG. 1 disassembled with the horizontal rails and the vertical stiles spaced from each other and illustrating the connectors on the parts to be joined.
Figure 5:
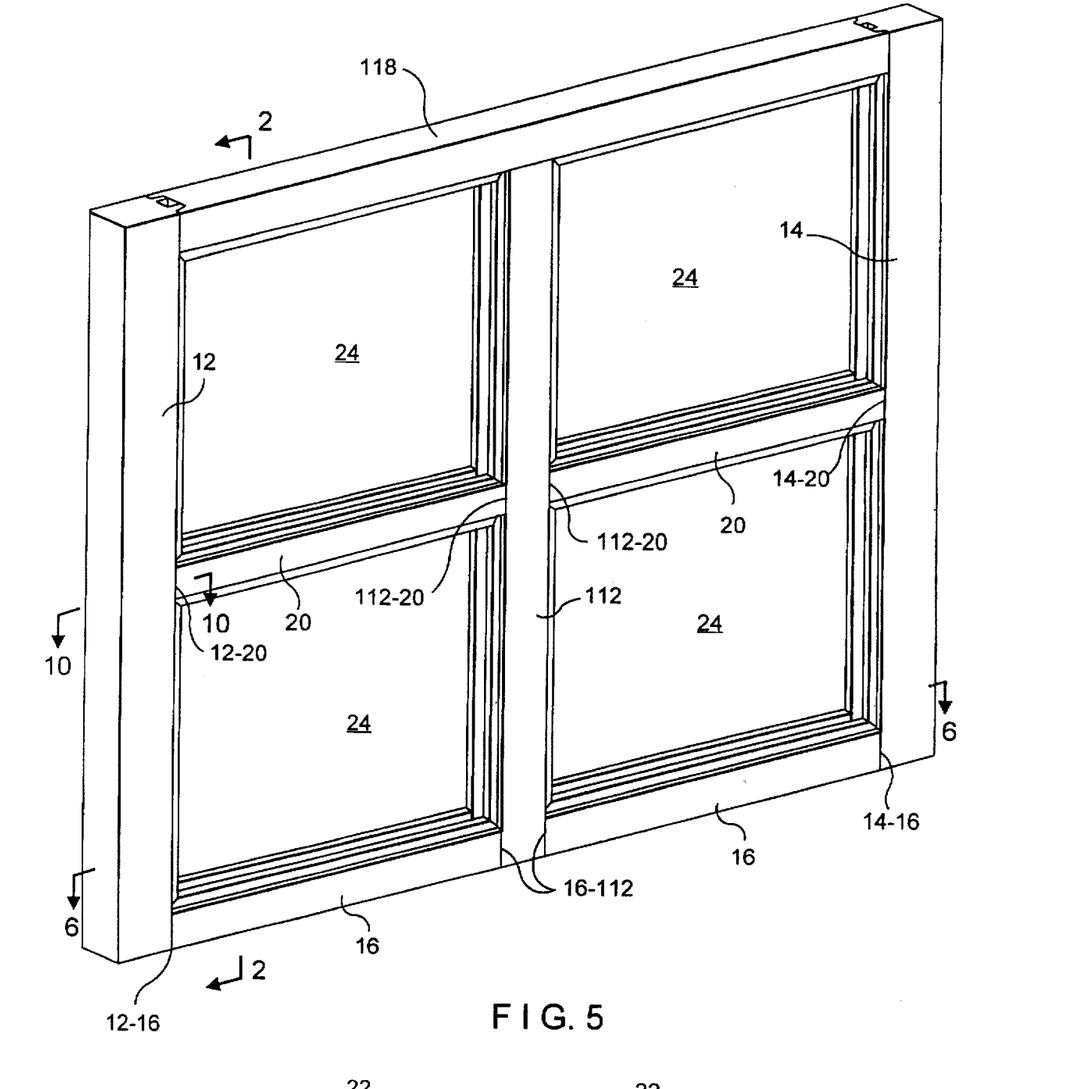
Figure 6:
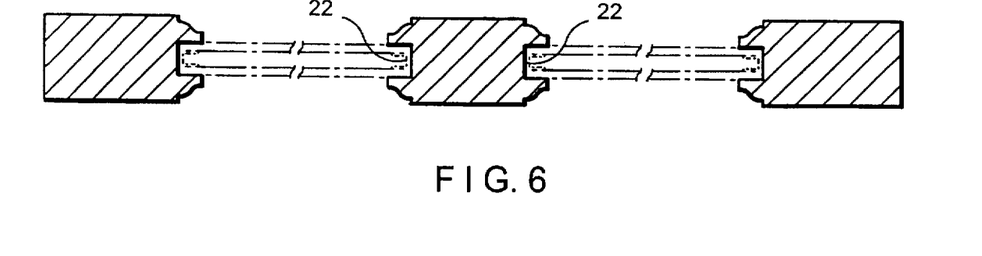
FIG. 6 is a transverse section taken along line 6—6 of FIG. 5 and illustrating the common center mullion spaced between the two outer stiles with inserts shown in dot-dashed outline.

Reference is now made to FIGS. 5 and 6 which show another embodiment of a frame according to the invention and this frame includes four panels 24 with stiles 12 and 14, rails 16 and 118. A center mullion 112 (a mullion is a linear member separating the panels and within the perimeter created by the rails and stiles) is provided which includes two panel receiving portions, e.g. grooves (one per edge) and two short rails (or mullions) 20 which overlies two additional panels 24. It will be evident that the frame can be increased by increasing any set of given members.

Stile 12 is connected to rail 16 at connection junction 12-16 by means of connector assembly 40 as discussed in FIGS. 7-11. In a similar manner, connector assembly 40 joins rail 16 to mullion 112 at both connections on both sides on mullion 112. The connection at the other end between rail 16 and stile 14 is the same type of connection. With respect to rails 20 and the joinder to mullion 112, the connection at connectors 112-20 are the same as that shown in FIGS. 7-11 and, the connection at rail 16 and rail 20 is also of the same type. The center mullion 112 is held in place by means of rails 16 and 20 which in turn are held in place by outer stiles 12 and 14. The upper rail 118 joins mullion 112 by 112 sliding into position by means of hardware connector assembly 40. The connection between stile 12 and top rail 118 and stile 14 and top rail 118 is also the same as that shown in FIGS. 7-11. The order of assembly is thus: 112 is joined to top rail 118, 12 and 14 are joined to 118, two panels 24 are slid into position, rails 20 are slid into position, two more panels 24 are positioned and finally rails 16 are slid into position locking all members into position. This completes the frame with four panels divided by mullions at the interior.

Figure 12:
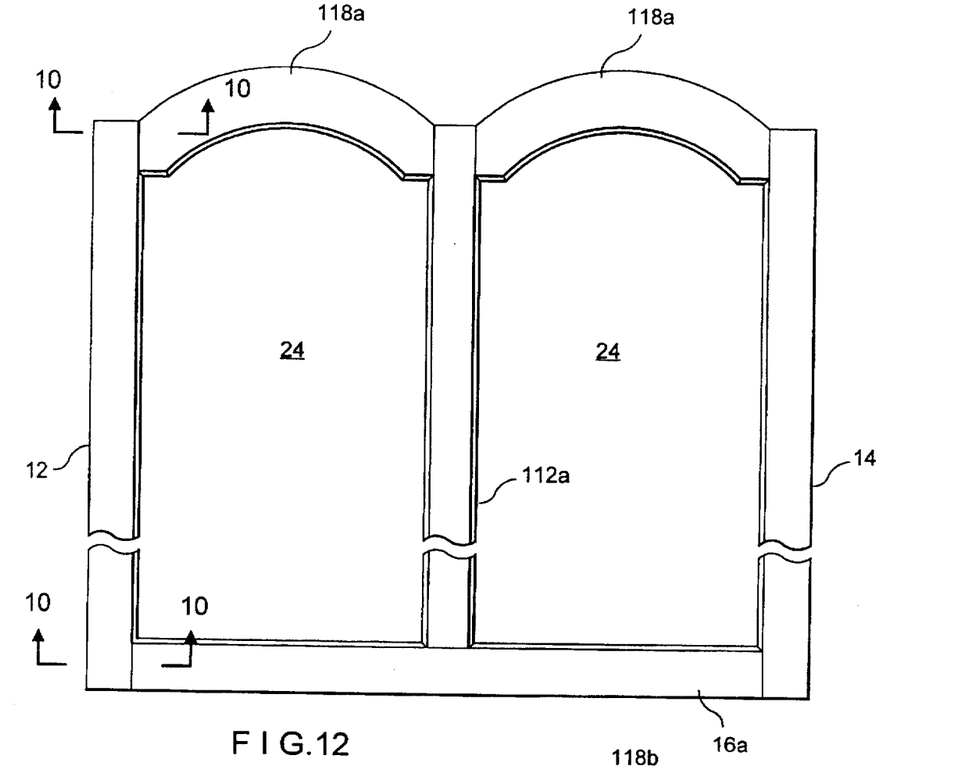
FIG. 12 is a front view of another embodiment of the frame which includes two outer vertical stiles and a center mullion with a bottom rail extending across and below the center mullion and joined to the two outer stiles at their inside edges, the center mullion being joined to the bottom rail, and two upper curved rails joined to the two outer stiles at their inside edges and connected with the center mullion. A variation of FIG. 12 would be for the top curved rail to run through end for end and for the center mullion to butt to it underneath.
Figure 13:
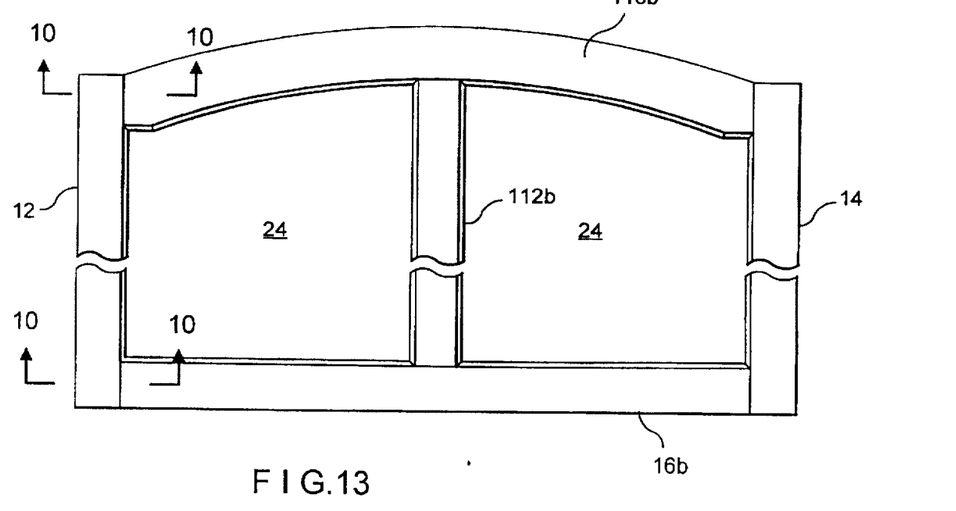
FIG. 13 is another modification of a frame in which there is a single curved upper rail, two outer stiles and a center mullion spaced between the two outer stiles.

Reference is now made to FIGS. 12-13 which show two different types of embodiments for arranging rails and stiles. These figures clearly demonstrate that vertical stiles and horizontal rails can have curvature imparted thereto or can be non-linear depending on the configuration desired, and while the stiles are shown as straight in these figures, it is possible to have curved rails and curved stiles, with the proviso that the panels must be insertable into the rails and stiles so that an appropriate and ultimately locking outer frame is achieved.

In FIG. 12, stiles 12, 14 and mullion 112a are shown as straight. The upper rails 118a are shown curved. In the FIG. 12 embodiment, the lower rail 16a is first connected with the stiles 12, 14 and mullion 112a. Then the panel inserts are placed into the individual areas and upper rails 118a are connected at the side with stiles 12 and 14 and mullion 112a.

Referring now to FIG. 13 which shows another modification and shows upper rail 118b as a single curved rail connected with stiles 12 and 14. This configuration uses a center mullion 112b which is connected to the top rail 118b with a dowel only. The bottom rail 16b is connected by its ends to stiles 12 and 14 and is joined to the mullion 112b with hardware connector assembly 40. The order of assembly is thus, bottom rail 16b is connected to side stiles 12 and 14, slide mullion 112b into place, slip panels 24 into openings created for them by frame, slide top rail 118b into place on stiles 12 and 14 with hardware connector assembly 40 at each end while positioning hole in top rail 118b onto dowel positioned in top of mullion 112b. This dowel holds the mullion in place and prevents lateral movement when top rail 118b is moved into position it locks entire assembly together.

DESCRIPTION OF OPERATION AND UTILITY

Strips of wood or other materials which are to be utilized to form an individual frame or any configuration thereof, be it single or multiple in formation can be used to carry out the invention. A typical use would be in the configuration of a folding room screen, finished on both sides as assembled, a picture frame ready for hanging, a trade show display which is similar to a folding room screen, a frame and panel assembly for case goods sides, etc., and a frame and panel wainscot or full room paneling. These uses are especially useful in RTA marketing where amateurs and home users do not have the professional equipment or expertise to join and clamp such configurations. Each section, or independent unit is formed by the joining of members, rails (horizontal members), and stiles (vertical members) usually at ninety degrees to one another to form a square or rectangle. Upon assembly, be the style traditional or contemporary, no means of assembly are visible. The method of assembly is by sliding one male hardware member into an opposite female hardware member by pressure only. No tools, such as screw drivers or wrenches, are required. (This is assuming factory mounting of the hardware.) A hammer or mallet may be required to tap the joints flush if the members are machined to very tight tolerances. In high production it would be possible to machine to careful tolerances which would probably make the use of a mallet unnecessary. The vertical side members or stiles which are the same size, most often run the length of the frame (as opposed to stopping atop the bottom rail or under the top rail). The top, bottom and center cross-pieces or rails are of the same length; but may vary in height (i.e. the short dimension); and as is traditional in most layouts, butt to the stiles at their inside edge. All inside edges of both rails and stiles are plowed with a panel receiving portion e.g. groove, running the length of the member. It is inside this panel receiving portion e.g. groove that the hardware is secured for assembly of the frame. Again, as is traditional, the inside edges of both faces are molded with a sticking pattern. The rails are coped (machined so as to configure the abutting molding profile) to the stiles on both faces i.e. front and back. A panel of any material, such as wood, fabric or glass is inserted into the plowed groove as the frame is being assembled, and the insert is locked in place when the fourth or last member forming the square or rectangular opening for the insert is pressed into position. The integral molding on both sides of the frame is what retains the panel. Depending upon the joining hardware chosen, it is possible to disassemble the frame so as to change the panel insert. This is possible when particular KD hardware used for assembly also allows disassembly of the joint. Some KD hardware as noted heretofore, cannot be disassembled, and it is a feature of the invention to provide for ease of assembly as well as disassembly.

In addition to those technical issues already discussed there is another which needs to be considered. This involves the natural shrinkage and expansion of wood. When one joins two pieces of wood together by gluing them, this natural movement is minimized as they relate to each other; however, it is not the intention of this invention to use glue. Therefore the natural and probably uneven movement of wood pieces placed one next to the other could create troublesome and aesthetically unacceptable problems for a finished product. To alleviate this issue a chamfer would be machined on the ends of the faces of the rails where they join the stiles. The use of the chamfer would eliminate this problem and become integral to the design.

Further a length of wood being joined at each end by the same connector assembly 40 can be secured to the bottom of the frame to act as a foot or glide for the frame assembly.

While there has been shown what is considered to be the preferred embodiments of the invention, it will be obvious to those skilled in the art that various changes and modifications may be made therein without departing from the scope of the invention.

What is claimed is:

1. A frame assembly of the knock-down type including component parts comprising vertical stiles, horizontal rails and connection-disconnection means associated with each of said vertical stiles and said horizontal rails, whereby the component parts can be shipped or transported in a knock-down condition and readily assembled with a minimum of tools or no tools and free of the use of glue, and the component parts can be easily disassembled when desired by moving said horizontal rails and said vertical stiles relative to each other, said frame assembly comprising:

at least one pair of vertical stiles and at least one pair of horizontal rails, said vertical stiles and said horizontal rails being connectable to each other;

connection-disconnection means provided for said horizontal rails and said vertical stiles for connecting one end of each of said horizontal rails to one of said vertical stiles, at least two of said horizontal rails having at each end thereof a horizontal rail end and each of said vertical stiles having at each end thereof a stile corner, said connection-disconnection means including a stationary receiver provided for said stile corner and a slidable connector provided for an end of said horizontal rail to be joined to said stile corner provided with said stationary receiver, said slidable connector being joinable with said stationary receiver for connection of one said horizontal rail end of each said horizontal rail to one said stile corner of an adjacent stile to form a four-sided frame having four sides comprising at least four adjacent connections formed by said connection-disconnection means between said horizontal rails and said vertical stiles including two of said horizontal rails and two of said vertical stiles to form a corner connection between one said stile corner and one said horizontal rail end adjacent to each other by joinder of said stationary receiver and said slidable connector of each said stile corner with said rail end for assembling said horizontal rails and said vertical stiles to form said four-sided frame;

said connection-disconnection means being provided for each adjacent connection of a stile corner and a rail end including for each said adjacent stile corner and said rail end a pair of connectable-disconnectable connecting elements, one of said connectable-disconnectable connecting elements being said stationary receiver and the other of said connecting elements being said slidable connector, and said pair of connectable-disconnectable elements being slidably connected together for joining one of said stile corners with one of said rail ends for each said adjacent connection and being slidably separable from each other for separation of said vertical stiles from said horizontal rails, said connection-disconnection means being connected with said vertical stiles and said horizontal rails internally of said frame where said vertical stiles and said horizontal rails are joined together, and access to said stationary receiver and said slidable connector being available solely when said vertical stiles and said horizontal rails are disconnected from each other, and hidden from view when said vertical stiles and said horizontal rails are joined together; and each of said vertical stiles and each of said horizontal rails including a panel holding means for receiving an insert portion of a panel, said panel holding means including a panel receiving and holding portion when assembled between said vertical stiles and said horizontal rails adapted to hold said insert portion to each said vertical stile and each said horizontal rail.

2. The frame assembly as claimed in claim 1, wherein said panel holding means for each said vertical stile includes a U-shaped receiving area and for each said horizontal rail includes a U-shaped receiving portion adapted to receive edges of the panel, said U-shaped receiving area and said U-shaped receiving portion being adapted to receive the insert portion of the panel forming a continuous U-shaped receiving and holding area with said U-shaped receiving portion and said U-shaped receiving area when said vertical stiles and said horizontal rails are joined together, said connection-disconnection means including legs of said U-shaped receiving area cooperating with legs of said U-shaped receiving portion.

3. The frame assembly as claimed in claim 2, wherein said stationary receiver includes a slotted member provided with a slot and said slidable connector includes a double headed member having a shank portion between said heads, said shank portion being slidable within said slot to provide for a tight fit between said adjacent connection of each said stile corner connected with each said horizontal rail end, said slotted member being confined within said first U-shaped area and free of access thereto externally thereof, and said double headed member being confined within said U-shaped portion and being free of access thereto when said slidable connector is received within said stationary receiver and are joined to each other.

4. The frame assembly as claimed in claim 1, wherein said U-shaped portion includes a first base and a pair of first legs extending therefrom and said U-shaped area includes a second base and a pair of second legs extending therefrom, said first base being larger than said second base, and the spacing between said first pair of legs being greater than the distance between outer portions of said second pair of legs for receiving said second pair of legs between said first pair of legs.

5. The frame assembly as claimed in claim 1, wherein said frame includes a plurality of vertical stiles and a plurality of horizontal rails, said horizontal rails and said vertical stiles each having slidable portions so that the horizontal rails and the vertical stiles are adapted to be slid relative to each other to provide for the insertion of a plurality of panels between said horizontal rails and said vertical stiles, said frame including at least three spaced vertical stiles, two of said vertical stiles forming outer vertical stiles and a third of said at least three spaced vertical stiles, forming an inner vertical stile spaced between said outer vertical stiles, said frame also including at least three horizontal rails, two of said horizontal rails being outer horizontal rails and one of said at least three horizontal rails being an inner horizontal rail substantially parallel to said two outer horizontal rails and located between said two outer horizontal rails, and said connection-disconnection means including said rail ends connecting corners of said outer horizontal rails and said outer vertical stiles so that all connections and disconnections take place internally of said frame.

6. The frame assembly as claimed in claim 5, wherein said connection-disconnection means also includes one of said slidable connectors at a rail end of each of said intermediate rails, and one of said stationary receivers coupled to each of said outer vertical stiles for connection with said slidable connector of each of said inner horizontal rails at a rail end thereof.

7. The frame assembly as claimed in claim 1, wherein said frame includes a pair of outer vertical stiles, a pair of outer horizontal rails and at least one center vertical mullion positioned between said pair of outer horizontal rails and between said vertical outer stiles, one of said outer rails being connectable and disconnectable by said connection-disconnection means internally of said frame with said center vertical mullion and at least one of said outer vertical stiles, respectively, another of said outer horizontal rails being connectable and disconnectable with said center vertical mullion by said connection-disconnection means, and at least one of said outer vertical stiles, at least one center horizontal rail positioned between said outer horizontal rails, one of said center horizontal rails being connectable by said connection-disconnection means with one of said outer vertical stiles and said vertical mullion, another of said center horizontal rails being connectable with the other of said outer vertical stiles and said vertical mullion and each of said horizontal rails, said vertical stiles and said vertical mullion including recessed portions for said connection-disconnection means for joinder of said vertical stiles, said horizontal rails and said vertical mullion and preventing access thereto externally of said frame after said vertical stiles, said horizontal rails and said vertical mullion being joined with each other.

8. The frame assembly as claimed in claim 7, wherein each of said horizontal rails between said outer horizontal rails includes a single horizontal rail having at least one of its rail ends connected with one of said outer vertical stiles, and said vertical mullion having one end in an abutting relationship with a recessed portion of one of said horizontal rail elements and another of its rail ends being connectable and disconnectable by said connection-disconnection means with one of said outer horizontal rails.

9. The frame assembly as claimed in claim 8, wherein one of said outer horizontal rails has an arcuate inner portion, and said vertical mullion has a longer dimension than either of said outer vertical stiles and extends between said outer horizontal rails, and said connection-disconnection means includes one of said stationary receivers connected with one of said outer horizontal rails and one of said slidable connectors connected with an end of said vertical mullion.

10. The frame assembly as claimed in claim 7, wherein said center horizontal rails include a pair of curved rails, one of said curved rails being connected by said connection-disconnection means between said vertical mullion and one of said outer vertical stiles, and the outer of said curved rails being connected between said vertical mullion and the other of said outer vertical stiles by said connection-disconnection means and being disconnectable from each other by said connection-disconnection means.

11. The frame assembly as claimed in claim 10, wherein said vertical mullion includes a pair of outer facing portions and a pair of oppositely disposed edge portions each having a panel receiving insert edge portion, one of said opposing edges facing one of said outer vertical stiles and cooperating therewith to receive said insert portion of said panels, and the other of said opposite sides facing the other of said outer vertical stiles and cooperating therewith to receive another of said insert portions of said panels.

12. The frame assembly as claimed in claim 11, wherein said vertical mullion includes one of said members of said connection-disconnection means in said panel receiving portion for connection with another of said members of said connection-disconnection means in said rail end and for the disconnection.

13. The frame assembly according to claim 12, wherein said vertical stiles have a U-shaped area and said horizontal rails have U-shaped portion and each includes parts complementary to each other to permit legs of at least one of said U-shaped areas and said U-shaped portions to fit between legs of the other of said U-shaped portions and said U-shaped areas, and the outer portion of one of said U-shaped areas and said U-shaped portions to smoothly merge with a complementary molded surface of the other of one of said U-shaped portions and said U-shaped areas.

14. The frame assembly according to claim 13, wherein said connection-disconnection means includes said stationary receiver for said vertical stiles and said slidable connector associated with said rail ends for permitting said rail ends and said vertical stiles to be connected together by slidably engaging said slidable connector with said stationary receiver in one direction and disengaging said rail ends and said vertical stiles by slidably moving said slidable connector and said stationary receiver relative to each other in an opposite direction to said one direction, while preventing access to said connection-disconnection means.

15. The frame assembly according to claim 11, wherein said panel receiving and holding portion is a groove.

16. The frame assembly according to claim 1, wherein said insert for said frame assembly is insertable as said vertical stiles and said horizontal rails are assembled.

17. The frame assembly as claimed in claim 1, wherein said panel receiving portion in said vertical stile is a first channel for receiving said slidable connector and said end rail includes a second channel for receiving said stationary receiver, said slidable connector and said stationary receiver being connected to said vertical stile and said horizontal rail, respectively, solely through said channels.

18. The frame assembly according to claim 1, wherein said panel receiving and holding portion is a U-shaped groove, and said U-shaped groove in said vertical stile includes a base for receiving said slidable connector and said rail end includes a U-shaped groove for receiving said stationary receiver.

19. The frame assembly as claimed in claim 18, wherein said stationary receiver includes a pair of outer tabs provided with an opening for receiving a screw connector for connecting said stationary receiver to a base portion of the U-shaped groove solely through said U-shaped groove, said slidable connector includes a threaded screw member comprising a screw head, a shank and a collar on said shank spaced from said screw head and which rests on a bottom of a groove on the rail end, and one of said tabs includes a tab opening wide enough to receive said screw head and said shank but insufficiently wide to receive said collar and a base portion connected between said tabs and provided with a longitudinal opening between said tabs communicating with said tab opening, and an increasing thickness diameter around said longitudinal opening forming a thickened portion to provide for a tight fit to produce a wedging between said screw head and said locking element on the screw head and said thickened portion.

* * * * *